(12) United States Patent
Kawamoto et al.

(10) Patent No.: US 8,023,933 B2
(45) Date of Patent: Sep. 20, 2011

(54) RADIO CONTROL METHOD AND RADIO CONTROL APPARATUS

(75) Inventors: Junichiro Kawamoto, Yokohama (JP); Takahiro Hayashi, Yokosuka (JP); Hiroyuki Ishii, Yokosuka (JP); Akihito Hanaki, Yokohama (JP); Yoshikazu Goto, Yokosuka (JP); Koji Furutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 957 days.

(21) Appl. No.: 11/843,354

(22) Filed: Aug. 22, 2007

(65) Prior Publication Data

US 2008/0207186 A1      Aug. 28, 2008

(30) Foreign Application Priority Data

Sep. 7, 2006   (JP) ................. P2006-243264

(51) Int. Cl.
*H04M 3/00*   (2006.01)
*H04W 4/00*   (2009.01)
*H04W 36/00*  (2009.01)

(52) U.S. Cl. ............... 455/418; 455/432.1; 455/442

(58) Field of Classification Search .......... 455/418, 455/432, 442, 432.1
See application file for complete search history.

(56) References Cited

U.S. PATENT DOCUMENTS

| | | | |
|---|---|---|---|
| 2005/0207374 A1* | 9/2005 | Petrovic et al. | 370/331 |
| 2005/0215255 A1 | 9/2005 | Tanoue | |
| 2006/0089142 A1* | 4/2006 | Vuorinen et al. | 455/436 |
| 2006/0245407 A1* | 11/2006 | Chen et al. | 370/338 |
| 2006/0246907 A1* | 11/2006 | Kaikkonen et al. | 455/442 |
| 2007/0049277 A1* | 3/2007 | Nakamata et al. | 455/436 |

FOREIGN PATENT DOCUMENTS

| | | |
|---|---|---|
| EP | 1 465 369 A1 | 10/2004 |
| EP | 1 583 292 A1 | 10/2005 |
| JP | 2005-277612 | 10/2005 |
| WO | WO 2004/057887 A1 | 7/2004 |

(Continued)

OTHER PUBLICATIONS

"3rd Generation Partnership Project; Technical Specification Group Radio Access Network; Radio Resource Control (RRC); Protocol Specification", 3GPP TS 25.331 Technical Specification, Version 6.10.0, Release 6, Jun. 2006, 1226 Pages.

(Continued)

*Primary Examiner* — Erika Gary
*Assistant Examiner* — Michael Mapa
(74) *Attorney, Agent, or Firm* — Oblon, Spivak, McClelland, Maier & Neustadt, L.L.P.

(57) ABSTRACT

A radio control method is arranged to use a mobile station 10, an active set 20 to perform radio communication with the mobile station 10, and a radio control apparatus 30 for controlling the radio communication between the mobile station 10 and the active set 20, and the radio control method has a determination step wherein in a situation where the mobile station 10, while performing radio communication through A-DPCH with the active set 20, performs radio communication through HS-PDSCH with one radio base station included in the active set 20, the radio control apparatus 30 makes a determination of maintenance to perform a process of maintaining the radio communication through the HS-PDSCH, on the occasion when the mobile station 10 gives a change command to change a configuration of the active set 20 so as to result in failure in maintenance of the radio communication through the HS-PDSCH.

5 Claims, 15 Drawing Sheets

FOREIGN PATENT DOCUMENTS

| | | |
|---|---|---|
| WO | WO 2006/035297 A2 | 4/2006 |
| WO | WO 2006/035297 A3 | 4/2006 |

OTHER PUBLICATIONS

"3rd Generation Partnership Project; Technical Specification Group Radio Access Network; High Speed Downlink Packet Access (HSDPA); Overall description", 3GPP TS 25.308 Technical Specification, Version 5.7.0, Stage 2, Release 5, Dec. 2004, 28 Pages.

"cdma2000 High Rate Packet Data Air Interface Specification", 3RD Generation Partnership Project 2 "3GPP2", 3GPP2 C.S0024-A, Version 1.0, Mar. 2004, 1083 Pages.

3GPP, High Speed Downlink Packet Access (HSDPA); Overall description; Stage 2 (Release 7), 3GPP TS 25.308, 3GPP, V 7.0.0 (Mar. 2006), Apr. 6, 2006, pp. 21-26.

Office Action issued Feb. 8, 2011, in Japanese Patent Application No. 2006-243264 with English translation.

\* cited by examiner

| ITEM NUMBER | BRANCH |
|---|---|
| 1 | RADIO BASE STATION 22 |

| ITEM NUMBER | BRANCH |
|---|---|
| 1 | RADIO BASE STATION 24 |
| 2 | RADIO BASE STATION 23 |
| 3 | RADIO BASE STATION 22 |

| ITEM NUMBER | BRANCH | CPICH-RSCP |
|---|---|---|
| 1 | RADIO BASE STATION 21 | -60 |
| 2 | RADIO BASE STATION 24 | -70 |
| 3 | RADIO BASE STATION 23 | -73 |
| 4 | RADIO BASE STATION 22 | -79 |
| 5 | RADIO BASE STATION 25 | -85 |

RADIO CONTROL METHOD AND RADIO CONTROL APPARATUS

BACKGROUND OF THE INVENTION

1. Field of the Invention

The present invention relates to a radio control method and radio control apparatus.

2. Related Background of the Invention

Non-patent Document 1 (3GPP Specification detail, 3GPP TS 25.331. [online]. version 6.10.0. [retrievedon 2006-09-07]. Retrieved from the Internet: <URL:http://www.3gpp.org/ftp/Specs/html-info/25331.htm>) and Non-patent Document 2 (3GPP Specification detail, 3GPP TS 25.308. [online]. version 5.7.0. [retrievedon 2006-09-07]. Retrieved from the Internet: <URL:http://www.3gpp.org/ftp/Specs/html-info/25308.htm>) describe the standard specification of the W-CDMA system, and Non-patent Document 3 (cdma2000 High Rate Packet Data Air Interface Specification. [online]. [retrievedon 2006-09-07]. Retrieved from the Internet: <URL:http://www.3gpp2.org/Public_html/specs/C.S0024-A_v1.0_040331.pdf>) describes the standard specification of the cdma2000 system. Furthermore, Non-patent Document 2 describes the specification of HSDPA (High Speed Downlink Packet Access) which is a high-speed downlink packet transmission system, and Non-patent Document 3 describes the specification of a high-speed downlink data transmission system (1xEV-DO). In the case of the W-CDMA system, a mobile station monitors the quality of radio communication with radio base stations (which is evaluated, for example, using CPICH-RSCP, CPICH-Ec/N0, pathloss, or the like indicating received signal power, which will be referred to hereinafter as radio quality, and which will be assumed to be based on CPICH-RSCP), and determines which should be performed, branch addition, branch elimination, or branch replacement, based on this radio quality. The mobile station notifies a radio control apparatus of this determination and the radio control apparatus performs control of soft hand over (SHO), based on this determination notified of by the mobile station.

A branch is a radio link between a mobile station and a radio base station and sometimes represents this radio base station itself. A collection of radio base stations (radio base station group) in radio communication through the use of SHO with a mobile station is referred to as an active set. The branch addition means adding a radio base station to perform communication through a radio link with a mobile station, to the active set. The branch elimination means eliminating any one of a plurality of radio base stations constituting the active set. The branch replacement means replacing a radio base station with the lowest radio quality among a plurality of radio base stations constituting the active set, with another radio base station which has a radio quality relatively better than that of the foregoing radio base station and which is not included in this active set.

SUMMARY OF THE INVENTION

In the HSDPA system, all signals of control information and user data transmitted through a radio uplink and control information transmitted through a radio downlink are transmitted via a plurality of branches constituting the active set. In contrast to it, user data transmitted through a radio downlink is transmitted via any one of a plurality of branches constituting the active set (a cell associated with this branch is called HS-Serving-Cell and will be referred to hereinafter as HSSC). However, when this HSSC is a target of the branch elimination or the branch replacement, it becomes difficult for the mobile station to maintain the radio communication by the HSDPA system. An object of the present invention is therefore to provide a radio control method and radio control apparatus suppressing elimination or replacement of a branch associated with HSSC, on the occasion when there arises a need for branch elimination or branch replacement.

The present invention is characterized by a radio control method using a mobile station, a radio base station group consisting of a plurality of radio base stations to perform radio communication with the mobile station, and a radio control apparatus for controlling the radio communication of the mobile station with the radio base station group, the radio control method comprising a determination step wherein in a situation where the mobile station, while performing radio communication through a first communication channel with the radio base station group, performs radio communication through a second communication channel with one radio base station included in the radio base station group, the radio control apparatus makes a determination of maintenance to perform a process of maintaining the radio communication through the second communication channel, on the occasion when the mobile station gives a change command to change a configuration of the radio base station group.

The present invention is characterized by a radio control apparatus for controlling radio communication between a mobile station and a radio base station group consisting of a plurality of radio base stations, the radio control apparatus comprising determining unit, wherein in a situation where the mobile station, while performing radio communication through a first communication channel with the radio base station group, performs radio communication through a second communication channel with one radio base station included in the radio base station group, the determining unit makes a determination of maintenance to perform a process of maintaining the radio communication through the second communication channel, on the occasion when the mobile station gives a change command to change a configuration of the radio base station group so as to result in failure in maintenance of the radio communication through the second communication channel.

The present invention is characterized by a radio control method using a mobile station, a radio base station group consisting of a plurality of radio base stations to perform radio communication with the mobile station, and a radio control apparatus for controlling the radio communication of the mobile station with the radio base station group, the radio control method comprising: a mobile station notification step wherein in a situation where the mobile station, while performing radio communication through a first communication channel with the radio base station group, performs radio communication through a second communication channel with one radio base station included in the radio base station group, the mobile station notifies the radio control apparatus of a command to eliminate one or more radio base stations with a low radio quality from the radio base station group and to add to the radio base station group a radio base station with a radio quality higher than that of the one or more radio base stations as elimination targets, among radio base stations not included in the radio base station group; an acquisition step wherein the radio control apparatus acquires the command notified of by the mobile station; a determination step wherein when the one radio base station in the radio communication through the second communication channel with the mobile station is included in the one or more radio base stations as the elimination targets, the radio control apparatus makes a determination of maintenance to perform a process of maintaining the radio communication through the second communication channel without use of the command; and a control apparatus notification step wherein the radio control apparatus notifies the mobile station of a command for control based on the determination of maintenance on the radio communication of the mobile station with the radio base station group.

The present invention is characterized by a radio control method using a mobile station, a radio base station group consisting of a plurality of radio base stations to perform radio communication with the mobile station, and a radio control apparatus for controlling the radio communication of the mobile station with the radio base station group, the radio control method comprising: a mobile station notification step wherein in a situation where the mobile station, while performing radio communication through a first communication channel with the radio base station group, performs radio communication through a second communication channel with one radio base station included in the radio base station group, the mobile station notifies the radio control apparatus of a command to eliminate one or more radio base stations included in the radio base station group, from the radio base station group; an acquisition step wherein the radio control apparatus acquires the command notified of by the mobile station; a determination step wherein when the one radio base station in the radio communication through the second communication channel with the mobile station is included in the one or more radio base stations as the elimination targets, the radio control apparatus makes a determination of maintenance to perform a process of maintaining the radio communication through the second communication channel without use of the command; and a control apparatus notification step wherein the radio control apparatus notifies the mobile station of a command for control based on the determination of maintenance on the radio communication of the mobile station with the radio base station group.

The radio control methods may be arranged as follows: in the determination step the radio control apparatus makes a determination to eliminate another radio base station except the radio base station in the radio communication through the second communication channel with the mobile station, from the radio base station group and to add a radio base station with a radio quality higher than that of the eliminated radio base station, to the radio base station group, as the determination of maintenance.

The radio control methods may also be arranged as follows: in the determination step the radio control apparatus makes a determination not to eliminate one or more radio base stations included in the radio base station group, from the radio base station group, as the determination of maintenance. Furthermore, the radio control methods may also be arranged as follows: in the determination step the radio control apparatus makes a determination to change the radio base station in the radio communication through the second communication channel with the mobile station, as the determination of maintenance.

Preferably, the first communication channel used is A-DPCH (Associated-Dedicated Physical CHannel), and the second communication channel used is HS-PDSCH (High Speed-Physical Downlink Shared CHannel) and HS-SCCH (High Speed-Shared Control CHannel); preferably, the communication from the radio base station group to the mobile station is carried out using HSDPA (High Speed Downlink Packet Access).

While the mobile station moves among cells of radio base stations, the mobile station gives the change command to change the configuration of the radio base station group so as to implement stabler radio communication. However, when the radio base station in the radio communication through the second communication channel with the mobile station is a change target, it becomes difficult to maintain this second communication channel. The present invention enables the maintenance of the second communication channel because the determination of maintenance of the radio communication through the second communication channel is made even in the case where the radio base station in the radio communication through the second communication channel with the mobile station is the change target.

The present invention successfully provides the radio control method and radio control apparatus that suppress the elimination or replacement of the branch associated with HSSC, even on the occasion when there arises a need for the branch elimination or the branch replacement.

DESCRIPTION OF THE PREFERRED EMBODIMENTS

Figure 1:
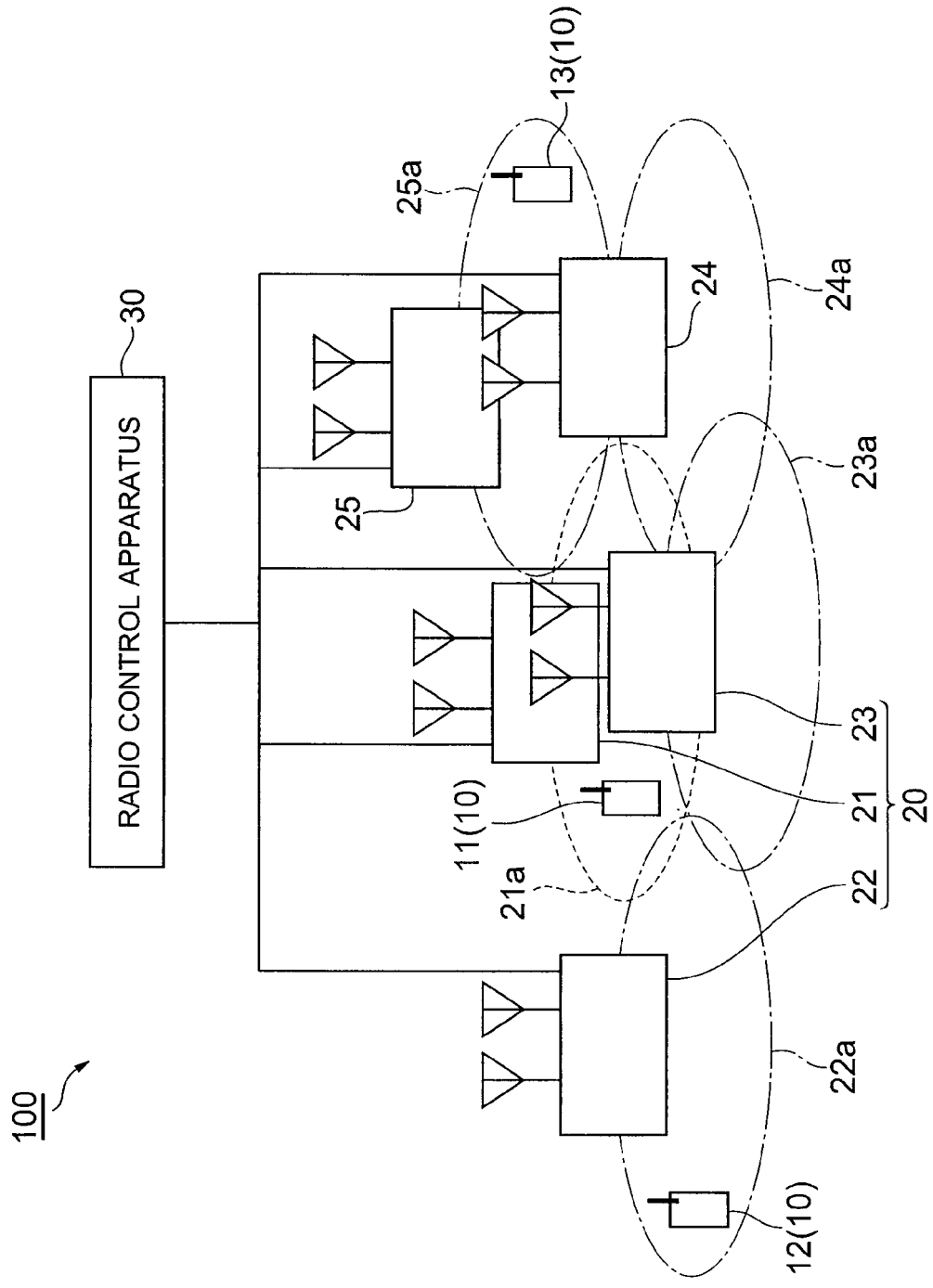
FIG. 1 is a drawing showing a configuration of a mobile communication system according to an embodiment.

The preferred embodiment according to the present invention will be described below in detail with reference to the drawings. The same elements will be denoted by the same reference symbols as much as possible, without redundant description. FIG. 1 is a block diagram showing a configuration of mobile communication system 100. The mobile communication system 100 is comprised of a plurality of mobile stations 11 to 13, a plurality of radio base stations 21 to 25, and a radio control apparatus 30. Mobile station 10 hereinafter will refer to any one of the mobile stations 11 to 13. The radio base stations 21-23 constitute an active set 20 (radio base station group) to perform radio communication with mobile station 10, and the radio base station 24 and radio base station 25 are assumed not to be in radio communication with the mobile station 10. The radio control apparatus 30 controls the radio communication of the mobile station 10 with the active set 20. Each of the radio base stations 21-25 is assumed to have one cell 21a-25a, but, without having to be limited to it, each base station may have a plurality of cells. In this case, a branch for communication through the use of SHO is set for each cell. The HSDPA system is applied to downlink branches in the mobile communication system 100.

The following will describe communication channels of the HSDPA system in the mobile communication system 100. Downlink branches used in the HSDPA system are HS-PD-SCH (High Speed-Physical Downlink Shared CHannel), HS-SCCH (High Speed-Shared Control CHannel), a downlink shared control channel used as shared by mobile station 10, and A-DPCH (Associated-Dedicated Physical CHannel) attendant on the HS-SCCH, which is individually assigned to mobile station 10. The HS-PDSCH corresponds to HS-DSCH (High Speed-Downlink Shared CHannel) as a transport channel. Uplink branches used herein are A-DPCH individually assigned to mobile station 10, and, in addition thereto, HS-DPCCH (High Speed-Dedicated Physical Control CHannel), a control channel for the HSDPA system individually assigned to mobile station 10. In a downlink branch, A-DPCH attendant on the downlink branch is used to transmit a control command or the like to control a transmitted power for A-DPCH attendant on an uplink branch, and a shared physical channel is used to transmit user data.

On the other hand, in an uplink branch, A-DPCH attendant on this uplink branch is used to transmit a pilot symbol, and a power control command (TPC command) for transmission of A-DPCH attendant on a downlink branch, in addition to user data, and an individual control channel for HSDPA is used to transmit scheduling of a shared channel, a radio quality of a downlink branch for use in AMCS (adaptive modulation and coding), and delivery confirmation information of a shared channel HS-DSCH of a downlink branch. In use of the HSDPA system, the mobile station 10 migrating among cells uses A-DPCH (first communication channel) for branches in the active set 20, and uses SHO for these A-DPCHs. On the other hand, since HS-PDSCH (second communication channel) is used in one branch in the active set 20, SHO is not applied to the HS-PDSCH, but Hard Hand Over (HHO) is applied thereto. A branch (radio base station) using the HS-PDSCH assigned to the mobile station 10 in radio communication by the HSDPA system will be referred to as HSSC.

Figure 2:
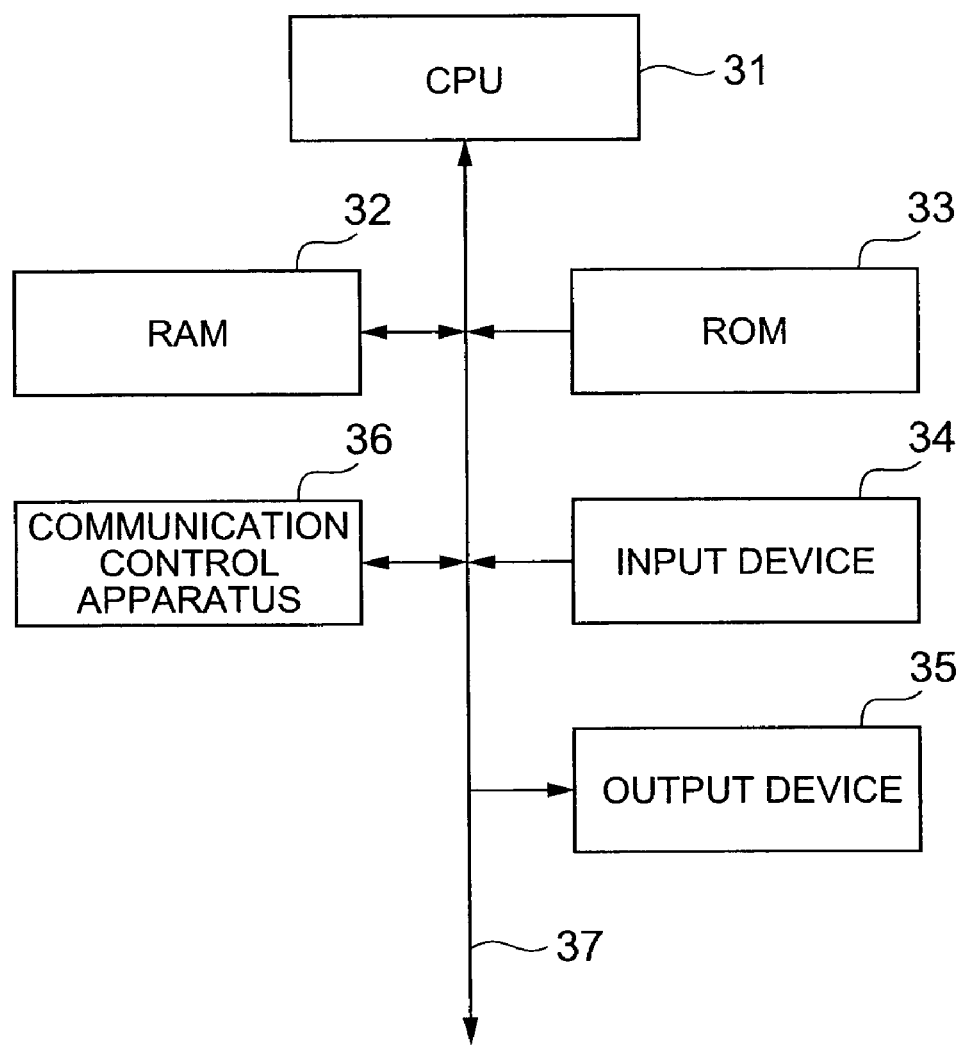
FIG. 2 is a drawing showing a configuration of a radio control apparatus.
Figure 3:
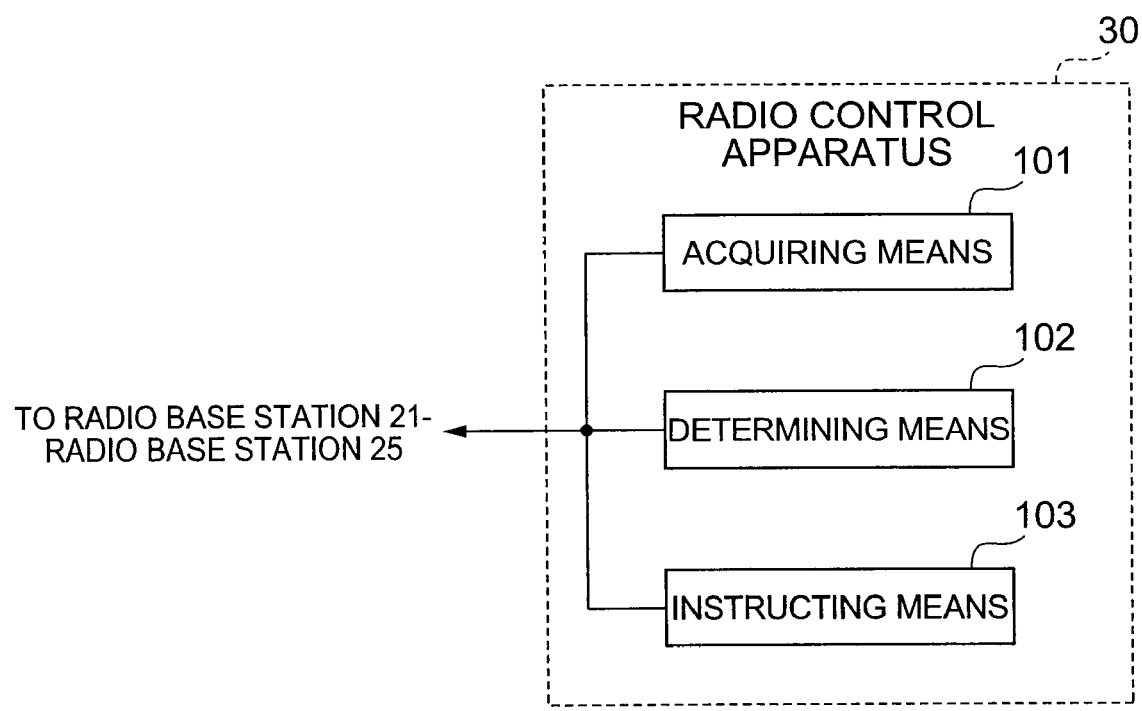
FIG. 3 is a drawing for explaining functions of the radio control apparatus.

The following will describe a configuration of the radio control apparatus 30 with reference to FIGS. 2 and 3. As shown in FIG. 2, the radio control apparatus 30 physically has CPU 31, RAM 32, ROM 33, input device 34, output device 35, and communication control apparatus 36, and these are connected through bus 37. The CPU 31 loads predetermined computer software stored in an internal memory such as the ROM 33, onto the RAM 32, and executes it to generally control the radio control apparatus 30. The input device 34 is a device for input of data such as a keyboard, and outputs input data to the CPU 31. The output device 35 is a device such as a display device like LCD, or a printer, and displays data fed from the CPU 31 on the LCD or the like, or prints the data on paper or the like. The communication control apparatus 36 has an interface for communication with mobile station 10 through the radio base stations 21-25.

The CPU 31 implements a plurality of functions shown in FIG. 3. FIG. 3 is a block diagram showing the functions of radio control apparatus 30 implemented by the CPU 31. The radio control apparatus 30 functionally has acquiring means 101, determining means 102, and instructing means 103. The acquiring means 101, determining means 102, and instructing means 103 are functions implemented when the CPU 31 executes the aforementioned computer software to activate each of the components of the radio control apparatus 30 shown in FIG. 2. Particularly, the CPU 31 uses each of the functions shown in FIG. 3, to execute processes shown in FIGS. 8 to 14.

Figure 4:
FIG. 4 is an example of data transmitted from a mobile station to the radio control apparatus.
Figure 5:
FIG. 5 is an example of data transmitted from a mobile station to the radio control apparatus.
Figure 6:
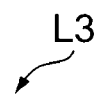
FIG. 6 is an example of data transmitted from a mobile station to the radio control apparatus.

The acquiring means 101 acquires data indicating occurrence of an event notified of by the mobile station 10 (e.g., a list L1 shown in FIG. 4, a list L2 shown in FIG. 5, and a list L3 shown in FIG. 6). The event is branch addition, branch elimination, branch replacement, or the like concerning the active set 20. The lists L1-L3 represent change commands to change the configuration of active set 20 (change commands from mobile station 10 to radio control apparatus 30), and data that the mobile station 10 notifies the radio control apparatus 30 of. Particularly, the list L1 indicates a command to eliminate a branch from the active set 20, and the list L2 represents a command to eliminate one or more radio base stations with a low radio quality (CPICH-RSCP) in the active set 20, from the active set 20 and to add to the active set 20 a radio base station with a radio quality higher than that of the one or more radio base stations as elimination targets, among radio base stations not included in the active set 20. The CPICH-RSCP is measured by mobile station 10.

When an event to indicate branch elimination occurs, the mobile station 10 notifies the radio control apparatus 30, for example, of the list L1 as shown in FIG. 4. A branch (radio base station 22) satisfying an elimination criterion (e.g., threshold Th1 shown in FIG. 7) is listed in the list L1. The allowable maximum number of branches to be listed in the list L1 is a number resulting from subtraction of 1 from the maximum number of branches included in the active set 20. In this case, the branches included in the active set 20 are arranged in descending order according to their CPICH-RSCPs. When an event to indicate branch replacement occurs, the mobile station 10 notifies the radio control apparatus 30, for example, of the list L2 as shown in FIG. 5 and the list L3 including CPICH-RSCP, as shown in FIG. 6, in addition to the list L2. The list L2 includes a branch (radio base station 24) to be newly added to the active set 20, and branches (radio base station 23 and radio base station 22) in the active set 20 with CPICH-RSCP smaller than that of the foregoing branch, and they are arranged in descending order according to their CPICH-RSCPs. As listed in this manner, the topmost branch (radio base station 24) in the list L2 is a branch to be newly added to the active set 20, and another branch (particularly, the radio base station 22 being the lowest-position branch in the list L2) is a branch to be eliminated from the active set 20. In contrast to it, the list L3 includes the radio base station 21 and others whose CPICH-RSCP was measured by the mobile station 10, regardless of whether they are included in the active set 20, and they are arranged in descending order according to their CPICH-RSCPs. The lists L1-L3 are created on the basis of the CPICH-RSCPs, but, without having to be limited to it, they may also be created on the basis of CPICH-Ec/N0 or pathloss.

Returning to FIG. 3, the radio control apparatus will be further described. The determining means 102 determines addition/elimination of a branch included in the active set 20, based on notification of an event from the mobile station 10 acquired by the acquiring means 101. For example, when the content of the event indicates the branch elimination, the determining means 102 determines to eliminate the branch included in the list (e.g., the list L2 shown in FIG. 5) transmitted with the notification of the event from the mobile station 10. When the content of the event indicates the branch replacement, the determining means 102 determines to eliminate a branch with the lowest CPICH-RSCP out of the plurality of branches constituting the active set 20 and, in place of this branch, add a branch with the highest CPICH-RSCP among the branches other than the branches constituting the active set 20, to the active set 20, based on the lists (e.g., the list L2 and additionally the list L3 as shown in FIG. 6) transmitted with the notification of the event from the mobile station 10.

When the branch as an elimination target corresponds to the HSSC, the determining means 102 does not perform the elimination of this branch, and makes a determination of maintenance to perform a process of maintaining the radio communication through HS-PDSCH. For example, when the mobile station 10 transmits a change command (list L1-list L3) to change the configuration of the active set 20 so as to result in failure in maintenance of the radio communication through HS-PDSCH, the determining means 102 makes the determination of maintenance to perform the process of maintaining the radio communication through HS-PDSCH. When the mobile station 10 transmits, for example, a command to eliminate from the active set 20 one or more radio base stations with a low radio quality (CPICH-RSCP) in the active set 20 and to add to the active set 20 a radio base station with a radio quality higher than that of the one or more radio base stations as elimination targets, among those not included in the active set 20, the determining means 102 makes the determination of maintenance to maintain the radio communication of the mobile station 10 through HS-PDSCH if the HSSC (radio base station 22 in the present embodiment) in the radio communication through HS-PDSCH with the mobile station 10 is included in the one or more radio base stations as elimination targets. When the mobile station 10 transmits, for example, a command to eliminate from the active set 20 one or more radio base stations included in the active set 20, the determining means 102 makes the determination of maintenance to maintain the radio communication of the mobile station 10 through HS-PDSCH if the HSSC (radio base station 22 in the present embodiment) in the radio communication through HS-PDSCH with the mobile station 10 is included in the one or more radio base stations as elimination targets. The instructing means 103 notifies the mobile station 10 of a command for control based on the above-described determination of maintenance on the radio communication of the mobile station 10 with the radio base station group.

Figure 7:
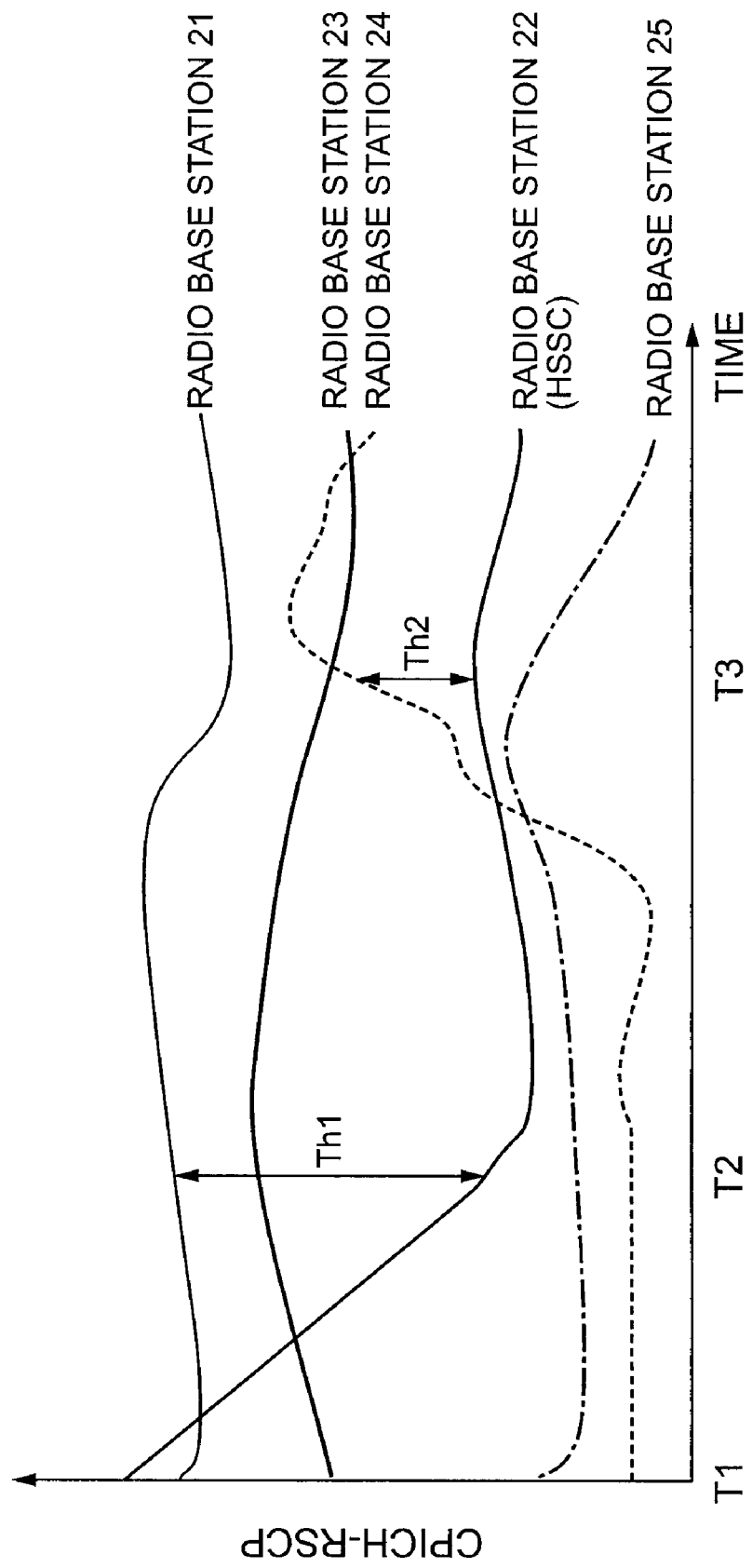
FIG. 7 is a drawing for explaining radio control by the radio control apparatus.

The following will describe an operation of the mobile station 10 associated with the branch replacement, with reference to FIG. 7. FIG. 7 shows an example of changes of CPICH-RSCPs in the common channel to the radio base stations 21-25. In a duration from time T1 to time T3, the mobile station 10 is in radio communication through the use of SHO with the radio base stations 21-23 included in the active set 20. The maximum number of branches included in the active set 20 is assumed to be "3."

At time T2, the difference of the CPICH-RSCP of the radio base station 22 with the smallest CPICH-RSCP included in the active set 20, from the CPICH-RSCP of the radio base station 21 with the largest CPICH-RSCP included in the active set 20 exceeds the threshold Th1, and thus the mobile station 10 determines elimination of the branch of radio base station 22 from the active set 20 and notifies the radio control apparatus 30 of the list L1. At time T3, the difference of the CPICH-RSCP of the radio base station 22 with the smallest CPICH-RSCP included in the active set 20, from the CPICH-RSCP of the radio base station 24 not included in the active set 20, exceeds a predetermined threshold Th2, and then the mobile station 10 makes a determination of replacement of the radio base station 22 with the radio base station 24, and notifies the radio control apparatus 30 of the list L2 (and the list L3).

In the present embodiment, for simplicity of description, hysteresis, time-to-trigger, and cell-individual-offsets all are assumed to be zero. In the present embodiment the mobile station 10 is arranged to notify the radio control apparatus 30 of one radio base station with a small CPICH-RSCP included in the active set 20 and one radio base station with a large CPICH-RSCP not included in the active set 20, as shown in the list L2 and in the list L3, but the mobile station may also be arranged to notify the radio control apparatus 30 of a plurality of radio base stations each. The mobile station 10 is arranged to make the determination for the branch addition, branch elimination, and branch replacement, and thereby suitably implements switching of radio communication using SHO.

Figure 8:
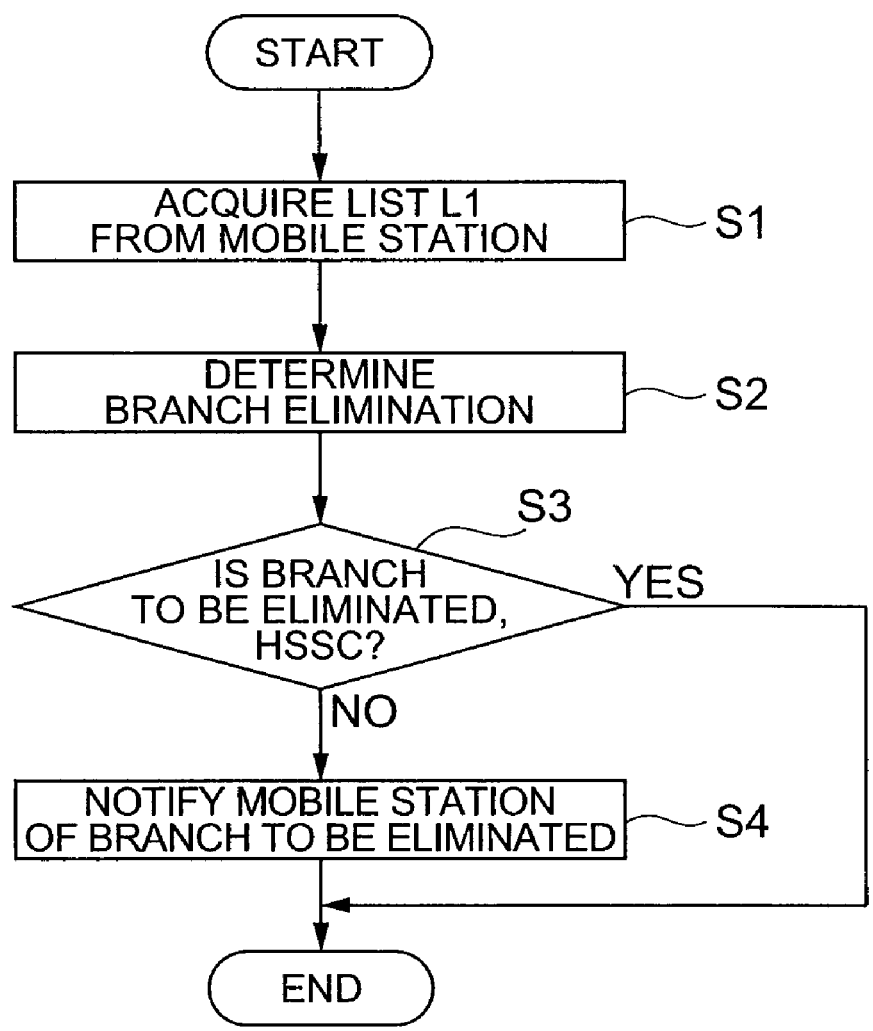
FIG. 8 is a flowchart for explaining contents of control according to the embodiment.

The following will describe an operation of the radio control apparatus 30 in the case where the content of the event indicates the branch elimination, with reference to FIG. 8. The acquiring means 101 acquires the list L1 from the mobile station 10 (step S1). Then the determining means 102 specifies the lowest branch (with the smallest CPICH-RSCP) among the branches listed in this list L1 (if the list includes only one branch like the list L1, this branch is specified), and determines to eliminate this specified branch from the active set 20 (i.e., to change the configuration of the active set 20) (step S2). Then the determining means 102 determines whether the branch determined to be eliminated in step S2 corresponds to the HSSC (step S3). When the determining means 102 determines that the branch determined to be eliminated in step S2 corresponds to the HSSC, i.e., when the configuration of the active set 20 is changed so as to result in failure in maintenance of HS-PDSCH (step S3; Yes), the determining means 102 determines not to eliminate the branch corresponding to the HSSC (or makes the determination of maintenance to perform the process of maintaining the HS-PDSCH), and the instructing means 103 sends to the mobile station 10 a command for control on the radio communication of the mobile station 10 with the active set 20, based on the determination of maintenance, and then terminates the processing. When the determining means 102 determines that the branch determined to be eliminated in step S2 does not correspond to the HSSC (step S3; No), the apparatus moves to step S4. In step S4, the instructing means 103 notifies the mobile station 10 of the branch determined to be eliminated in step S2, and then terminates the processing (step S4). When the list L1 contains a plurality of branches, the branch determined to be eliminated in step S2 may be the lowest branch in the list L1, or a branch specified at random in the list L1.

Figure 9:
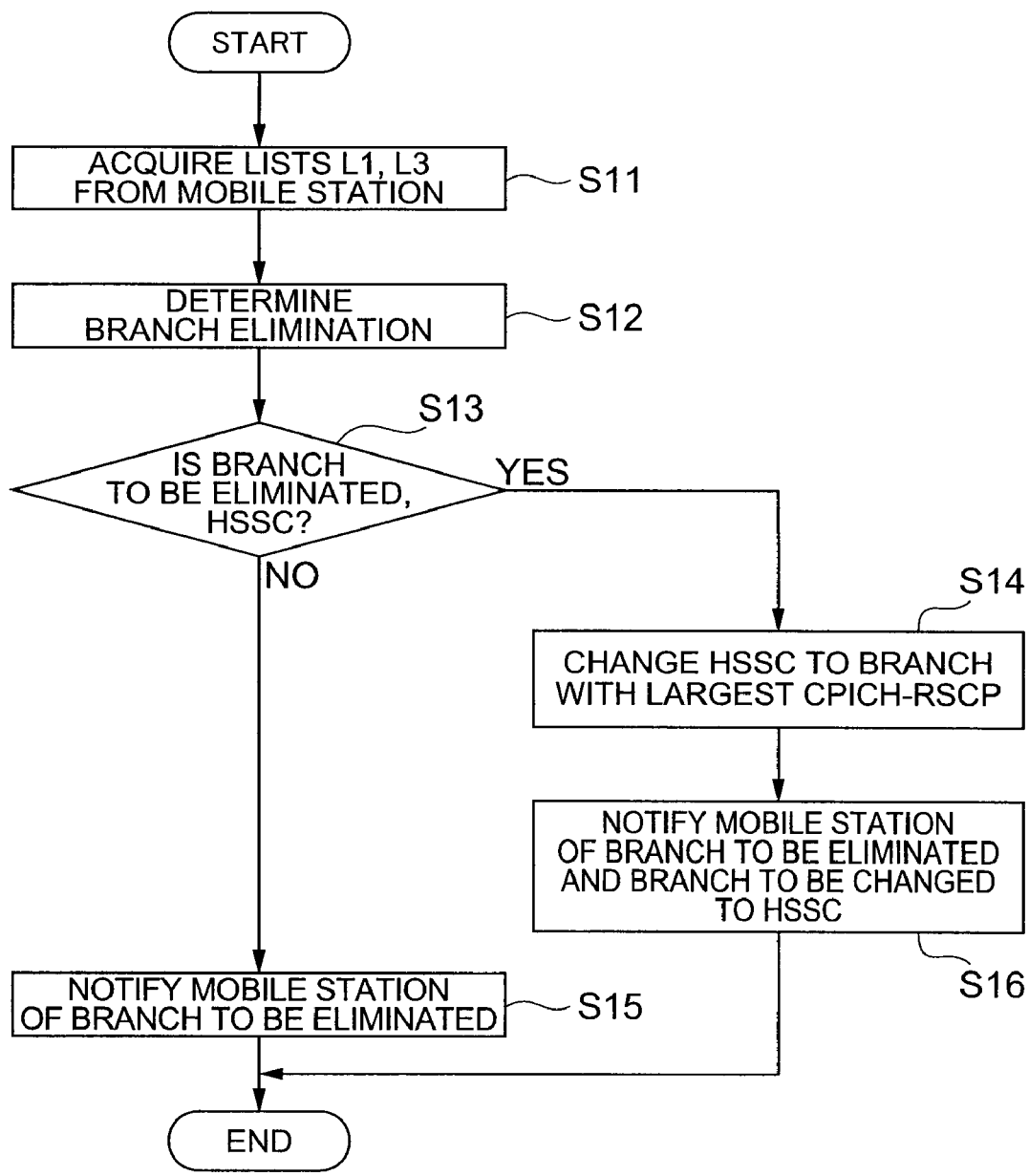
FIG. 9 is a flowchart for explaining contents of control according to the embodiment.

The following will describe another operation of the radio control apparatus 30 in the case where the content of the event indicates the branch elimination, with reference to FIG. 9. The respective contents of step S12, step S13, and step S15 in FIG. 9 are the same as the respective contents of step S2, step S3, and step S4 in FIG. 8, except for their step numbers. Therefore, the below will describe the contents of step S11, step S14, and step S16. The acquiring means 101 acquires the list L1 and the list L3 from the mobile station 10 (step S11) and moves to step S12. After step S12, if the branch determined to be eliminated in step S12 corresponds to the HSSC, i.e., if the configuration of the active set 20 is changed so as to result in failure in maintenance of HS-PDSCH (step S13; Yes), the determining means 102 makes a determination to change the HSSC to a branch with the largest CPICH-RSCP among the plurality of branches included in the active set 20 in the list L3 (or makes the determination of maintenance to perform the process of maintaining the HS-PDSCH) (step S14). After step S14, the instructing means 103 notifies the mobile station 10 of a command for control on the radio communication of the mobile station 10 with the active set 20, based on the determination of maintenance (or notifies the mobile station 10 of a branch to be eliminated from the active set 20 and a branch to be newly designated as the HSSC (to be changed to HSSC)) and terminates the processing (step S16). If the list L1 contains a plurality of branches, the branch determined to be eliminated in step S12 may be the lowest branch in the list L1, or may be a branch specified at random in the list L1.

Figure 10:
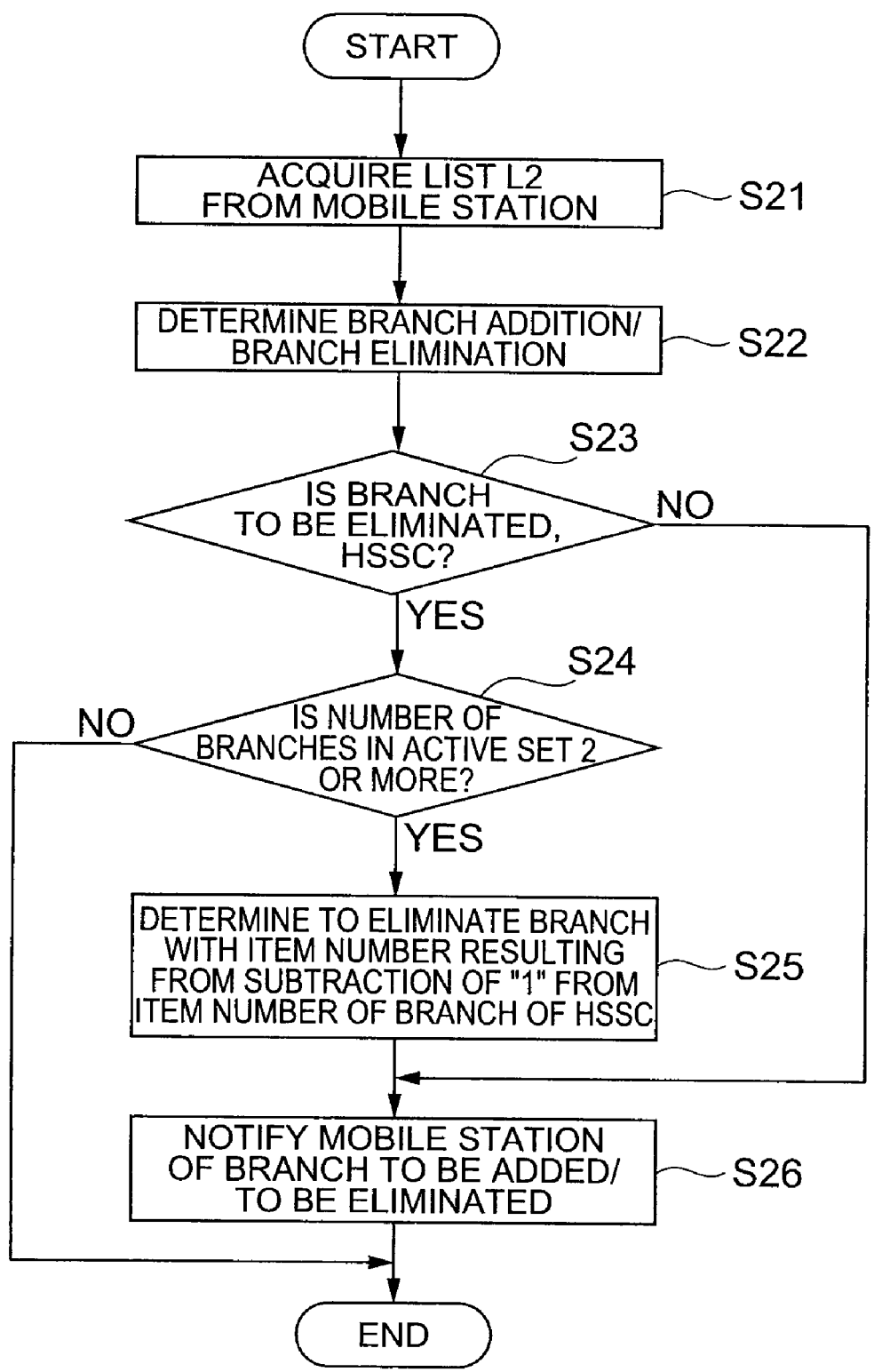
FIG. 10 is a flowchart for explaining contents of control according to the embodiment.

The following will describe an operation of the radio control apparatus 30 in the case where the content of the event indicates the branch replacement, with reference to FIG. 10. The acquiring means 101 acquires the list L2 from the mobile station 10 (step S21). Then the determining means 102 determines to add the highest branch in the list L2 to the active set 20 and to eliminate the lowest branch from the active set 20 (or determines to change the configuration of the active set 20) (step S22). Then the determining means 102 determines whether the branch determined to be eliminated in step S22 corresponds to the HSSC (step S23). When the determining means 102 determines that the branch determined to be eliminated corresponds to the HSSC, i.e., when the configuration of the active set 20 is changed so as to result in failure in maintenance of HS-PDSCH (step S23; Yes), it moves to step S24; when it determines that the branch determined to be eliminated does not correspond to the HSSC (step S23; No), it moves to step S26. In step 24, the determining means 102 determines whether the number of branches in the active set 20 in the list L2 is 2 or more (step S24).

When the number of branches in the active set 20 in the list L2 is 2 or more (step S24; Yes), the determining means 102 moves to step S25; when the number of branches in the active set 20 in the list L2 is 1 (step S24; No), the determining means 102 determines that the branch corresponding to the HSSC should not be eliminated (or makes the determination of maintenance to perform the process of maintaining the HS-PDSCH), and the instructing means 103 notifies the mobile station 10 of a command for control on the radio communication of the mobile station 10 with the active set 20, based on the determination of maintenance, and terminates the processing. In step S25, the determining means 102 makes a determination to eliminate a branch with an item number resulting from subtraction of "1" from the item number of the HSSC (the sequence in the list L2) among the branches included in the active set 20 in the list L2 (or makes the determination of maintenance to perform the process of maintaining the HS-PDSCH) (step S25). After step S25 (or after the branch "NO" in step S23), the instructing means 103 notifies the mobile station 10 of a command for control on the radio communication of the mobile station 10 with the active set 20, based on this determination of maintenance (or notifies the mobile station 10 of the branch determined to be eliminated in step S25 and the branch determined to be added in step S22) and then terminates the processing (step S26).

The branch determined to be added in step S22 may be a branch with the largest CPICH-RSCP out of the plurality of branches not included in the active set 20 in the list L3, using the list L3, and the branch determined to be eliminated in step S22 may be a branch with the smallest CPICH-RSCP out of the plurality of branches included in the active set 20 in the list L3. In this case, the acquiring means 101 acquires the list L3, in addition to the list L2, from the mobile station 10 in step S21. The branch determined to be added in step S22 may be the highest branch in the list L2, or may be a branch specified at random out of the plurality of branches not included in the active set 20 in the list L2.

Figure 11:
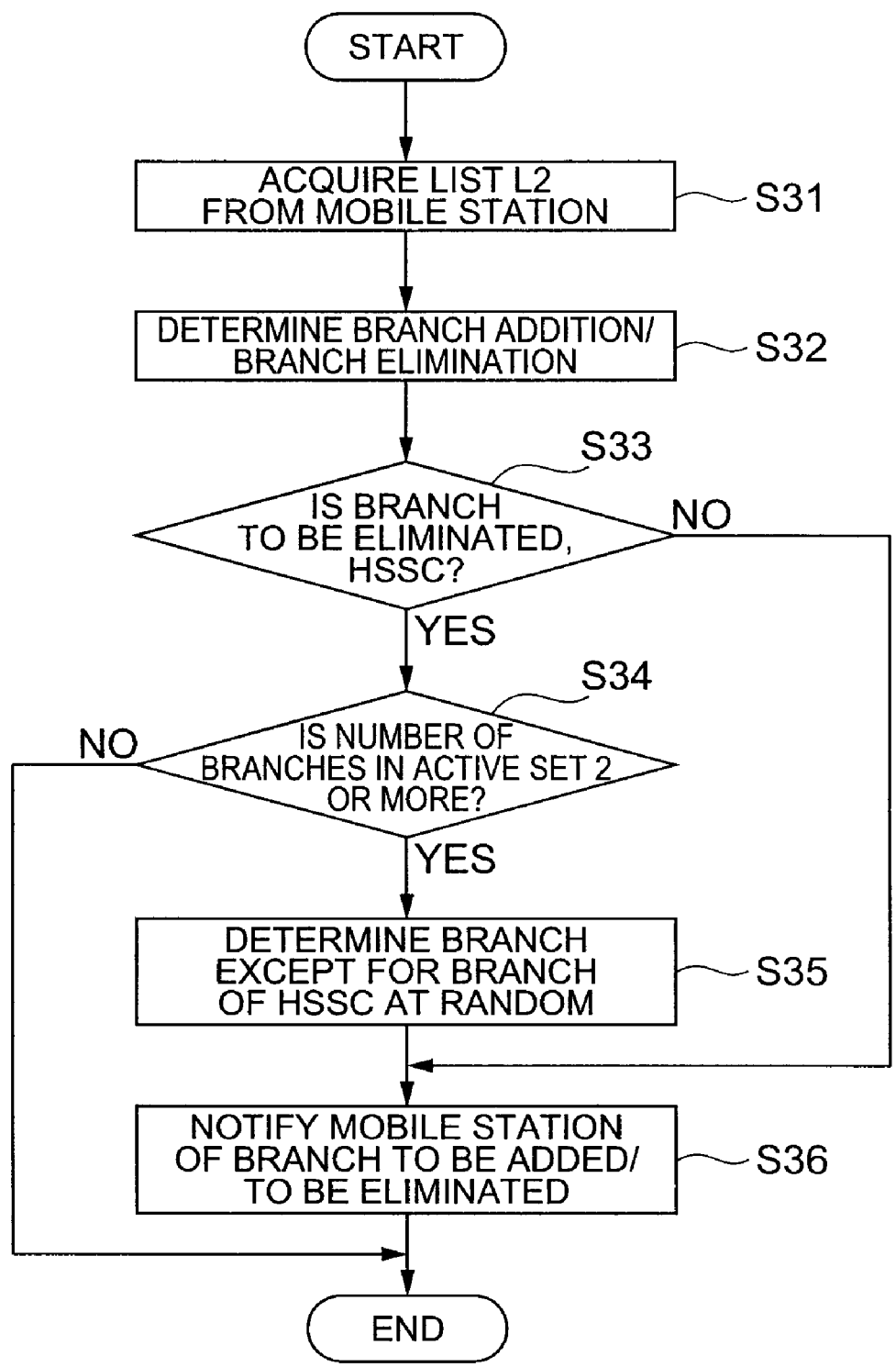
FIG. 11 is a flowchart for explaining contents of control according to the embodiment.

The following will describe another operation of the radio control apparatus 30 in the case where the content of the event indicates the branch replacement, with reference to FIG. 11. The respective contents of steps S31-S34 and step S36 shown in FIG. 11 are the same as the respective contents of steps S21-S24 and step S26 shown in FIG. 10, except for their step numbers. Therefore, the content of step S35 will be described below. After the branch "YES" in step S34, the determining means 102 randomly determines one branch to be eliminated from the branches except for the HSSC out of the plurality of branches included in the active set 20 in the list L2 (or makes the determination of maintenance to perform the process of maintaining the HS-PDSCH) (step S35), and then moves to step S36. The branch determined to be added in step S32 may be a branch with the largest CPICH-RSCP out of the plurality of branches not included in the active set 20 in the list L3, and the branch determined to be eliminated in step S32 may be a branch with the smallest CPICH-RSCP out of the plurality of branches included in the active set 20 in the list L3. In this case, the acquiring means 101 acquires the list L3, in addition to the list L2, from the mobile station 10 in step S31. The branch determined to be added in step S32 may be the highest branch in the list L2, or may be a branch specified at random out of the plurality of branches not included in the active set 20 in the list L2.

Figure 12:
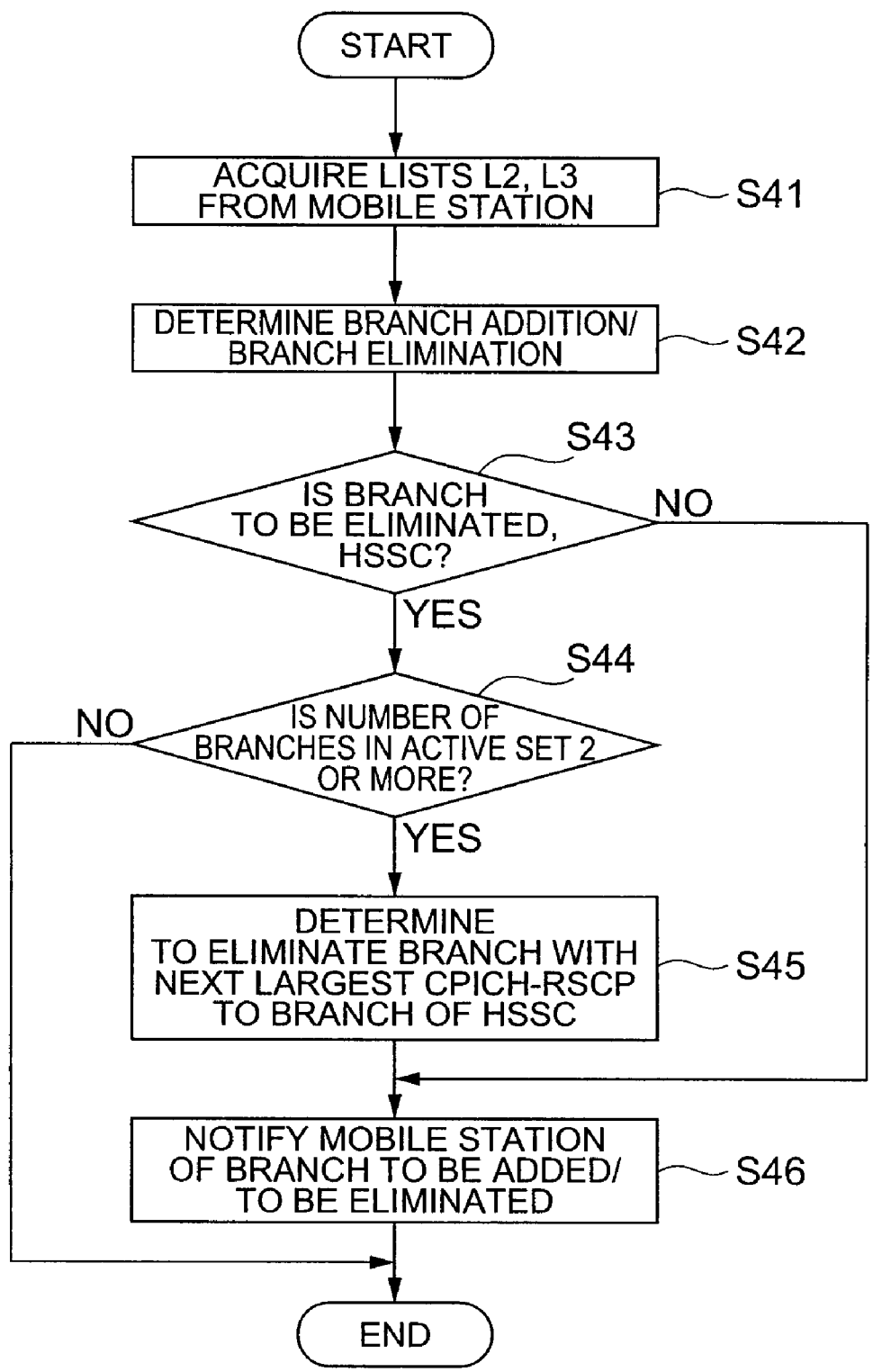
FIG. 12 is a flowchart for explaining contents of control according to the embodiment.

The following will describe another operation of the radio control apparatus 30 in the case where the content of the event indicates the branch replacement, with reference to FIG. 12. The acquiring means 101 acquires the list L2 and the list L3 from the mobile station 10 (step S41). Then the determining means 102 determines to add the highest branch in the list L2 to the active set 20 and to eliminate the lowest branch from the active set 20 (or changes the configuration of the active set 20) (step S42). Then the determining means 102 determines whether the branch determined to be eliminated in step S42 corresponds to the HSSC (step S43). When the determining means 102 determines that the branch determined to be eliminated corresponds to the HSSC, i.e., when the configuration of the active set 20 is changed so as to result in failure in maintenance of the HS-PDSCH (step S43; Yes), the determining means 102 moves to step S44; when it determines that the branch determined to be eliminated does not correspond to the HSSC (step S43; No), it moves to step S46. In step 44, the determining means 102 determines whether the number of branches in the active set 20 included in the list L2 is 2 or more (step S44).

When the number of branches in the active set 20 in the list L2 is 2 or more (step S44; Yes), the determining means 102 moves to step S45; when the number of branches in the active set 20 in the list L2 is 1 (step S44; No), the determining means 102 determines that the branch corresponding to the HSSC should not be eliminated (or makes the determination of maintenance to perform the process of maintaining the HS-PDSCH), and the instructing means 103 notifies the mobile station 10 of a command for control on the radio communication of the mobile station 10 with the active set 20 (or a command not to perform the elimination), based on the determination of maintenance, and terminates the processing. In step S45, the determining means 102 determines to eliminate a branch with the next largest CPICH-RSCP to the branch of HSSC among the branches included in the active set 20 in the list L3 (or makes the determination of maintenance to perform the process of maintaining the HS-PDSCH) (step S45), and then moves to step S46. After step S45 (or after the branch "NO" in step S43), the instructing means 103 notifies the mobile station 10 of a command for control on the radio communication of the mobile station 10 with the active set 20 (or notifies the mobile station 10 of the branch determined to be eliminated in step S45 and the branch determined to be added in step S42), based on the determination of maintenance, and then terminates the processing (step S46).

The branch determined to be added in step S42 may be a branch with the largest CPICH-RSCP out of the plurality of branches not included in the active set 20 in the list L3, and the branch determined to be eliminated in step S42 may be a branch with the smallest CPICH-RSCP out of the plurality of branches included in the active set 20 in the list L3. The branch determined to be added in step S42 may be the highest branch in the list L2 or may be a branch specified at random out of the plurality of branches not included in the active set 20 in the list L2.

Figure 13:
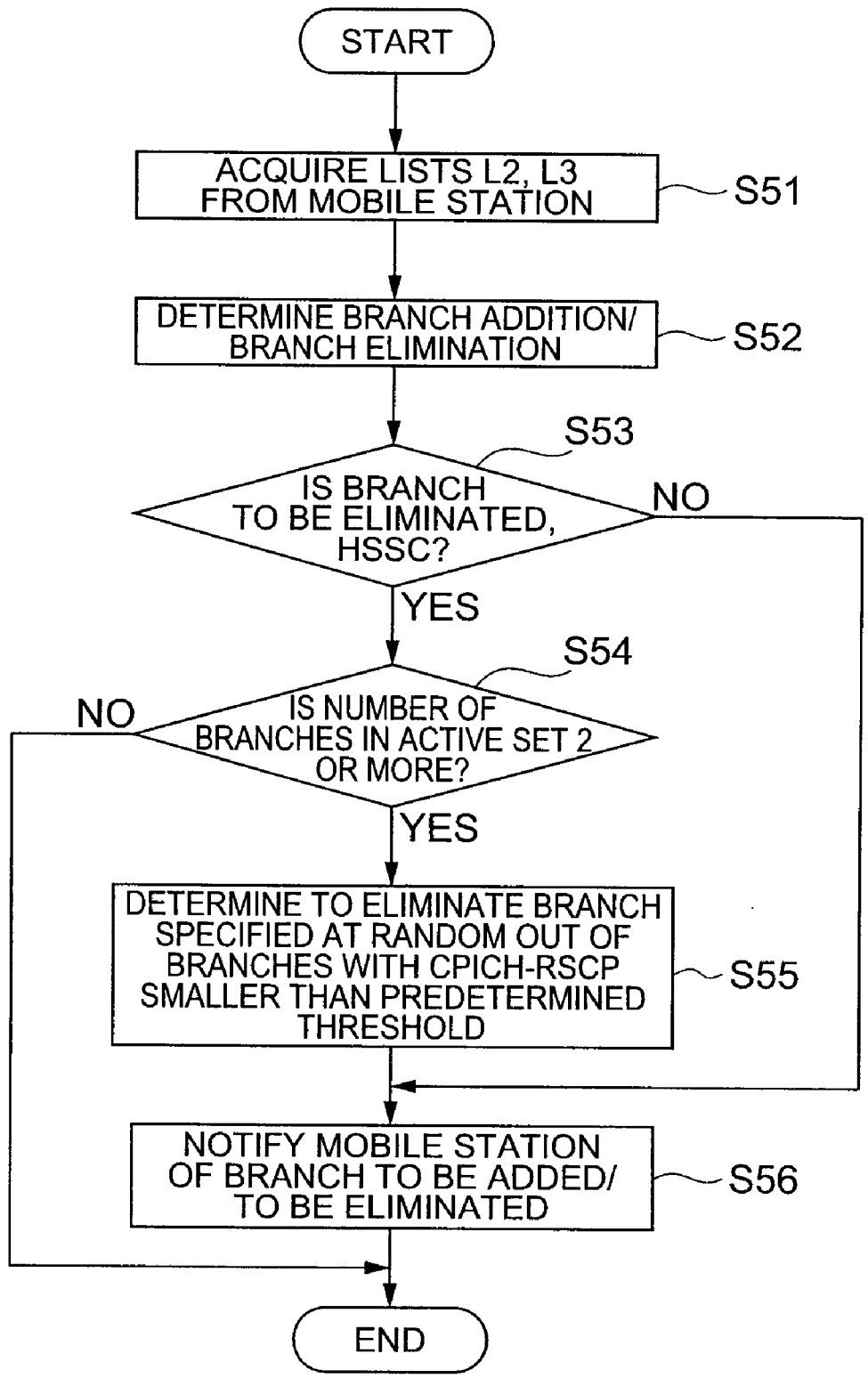
FIG. 13 is a flowchart for explaining contents of control according to the embodiment.

The following will describe another operation of the radio control apparatus 30 in the case where the content of the event indicates the branch replacement, with reference to FIG. 13. The respective contents of steps S51-S54 and step S56 shown in FIG. 13 are the same as the respective contents of steps S41-S44 and step S46 shown in FIG. 12, except for their step numbers. Therefore, the content of step S55 will be described below. When the number of branches in the active set 20 included in the list L2 is 2 or more (step S54; Yes), the determining means 102 determines to eliminate from the active set 20 one branch except for the HSSC specified at random out of a plurality of branches with the CPICH-RSCP being smaller than a predetermined threshold α, out of the plurality of branches included in the active set 20 in the list L3 (or makes the determination of maintenance to perform the process of maintaining the HS-PDSCH) (step S55), and then moves to step S56. The threshold α may be stored in a memory in the radio control apparatus 30 or may be notified of by the mobile station 10. The threshold α may be a preset constant value, or may be an average of CPICH-RSCPs in the list L3 (or a value resulting from addition of a predetermined offset value to this average). In this case, the threshold α differs depending upon the list L3.

The branch determined to be added in step S52 may be a branch with the largest CPICH-RSCP out of the plurality of branches not included in the active set 20 in the list L3, and the branch determined to be eliminated in step S52 may be a branch with the smallest CPICH-RSCP out of the plurality of branches included in the active set 20 in the list L3. The branch determined to be added in step S52 may be the highest branch in the list L2, or may be a branch specified at random out of the plurality of branches not included in the active set 20 in the list L2.

Figure 14:
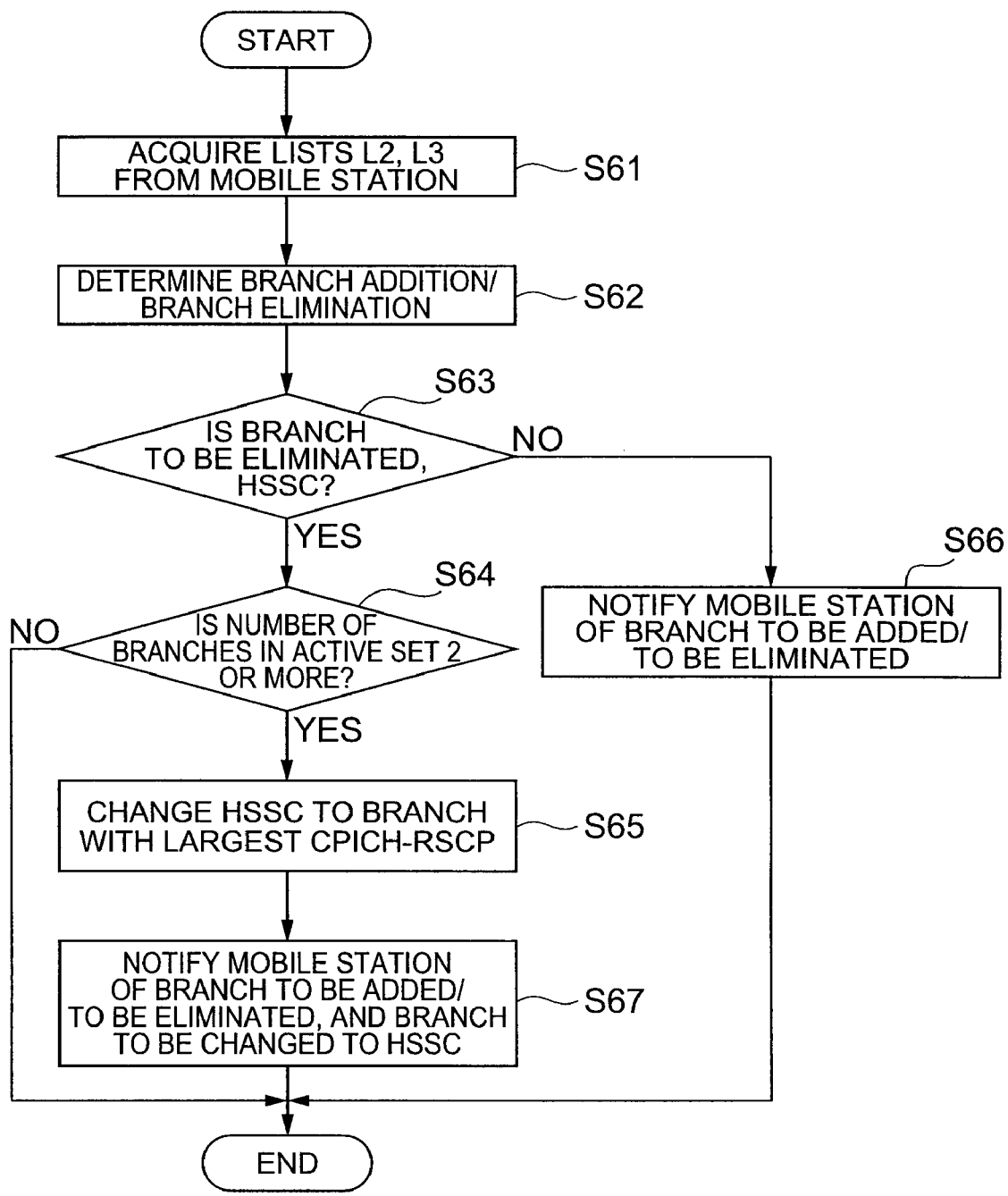
FIG. 14 is a flowchart for explaining contents of control according to the embodiment.

The following will describe another operation of the radio control apparatus 30 in the case where the content of the event indicates the branch replacement, with reference to FIG. 14. The respective contents of steps S61-S64 shown in FIG. 14 are the same as the respective contents of steps S41-S44 shown in FIG. 12, except for their step numbers. Therefore, the below will describe the contents of steps S65 to S67. When the determining means 102 determines that the branch determined to be eliminated and the branch determined to be added in step S62 do not correspond to the HSSC (step S63; No), the instructing means 103 notifies the mobile station 10 of the branch determined to be eliminated and the branch determined to be added in step S62, based on this determination, and terminates the processing (step S66). When the determining means 102 determines that the branch determined to be eliminated in step S62 corresponds to the HSSC, i.e., when the configuration of the active set 20 is changed so as to result in failure in maintenance of the HS-PDSCH (step S63; Yes), the determining means 102 determines whether the number of branches in the active set 20 included in the list L2 is 2 or more (step S64).

When the number of branches in the active set 20 included in the list L2 is 2 or more (step S64; Yes), the determining means 102 determines to change the HSSC to a branch with the largest CPICH-RSCP out of the plurality of branches included in the active set 20 in the list L3 (or makes the determination of maintenance to perform the process of maintaining the HS-PDSCH) (step S65). After step S65, the instructing means 103 notifies the mobile station 10 of the branch newly designated as the HSSC (changed to the HSSC) in step S65, and the branch determined to be eliminated and the branch determined to be added in step S62, and then terminates the processing (step S67). The threshold α may be stored in the memory in the radio control apparatus 30 or may be notified of by the mobile station 10. The threshold α may be a preset constant value or an average of CPICH-RSCPs included in the list L3 (or a value resulting from addition of a predetermined offset value to this average). In this case, the threshold α differs depending upon the list L3.

The branch determined to be added in step S62 may be a branch with the largest CPICH-RSCP out of the plurality of branches not included in the active set 20 in the list L3, and the branch determined to be eliminated in step S62 may be a branch with the smallest CPICH-RSCP out of the plurality of branches included in the active set 20 in the list L3. The branch determined to be added in step S62 may be the highest branch in the list L2, or may be a branch specified at random out of the plurality of branches not included in the active set 20 in the list L2.

In the present embodiment the CPICH-RSCP was used as the radio quality between the mobile station 10 and the radio base stations 21-25, but, without having to be limited to it, the radio quality may be evaluated using CPICH-Ec/N0 or pathloss. The present embodiment is also applicable to the event contents other than the branch elimination, branch addition, and branch replacement, and is also applicable to the radio systems other than the HSDPA system; e.g., HSUPA (High Speed Uplink Packet Access), EnHanced-Uplink, and so on. Furthermore, the present embodiment is also applicable, for example, to the high-speed packet transmission system provided by Long-Term-Evolution in 3GPP2, the high-speed packet transmission systems in cdma2000 1×EV-DO in 3GPP2, and in the TDD system, and so on.

Figure 15:
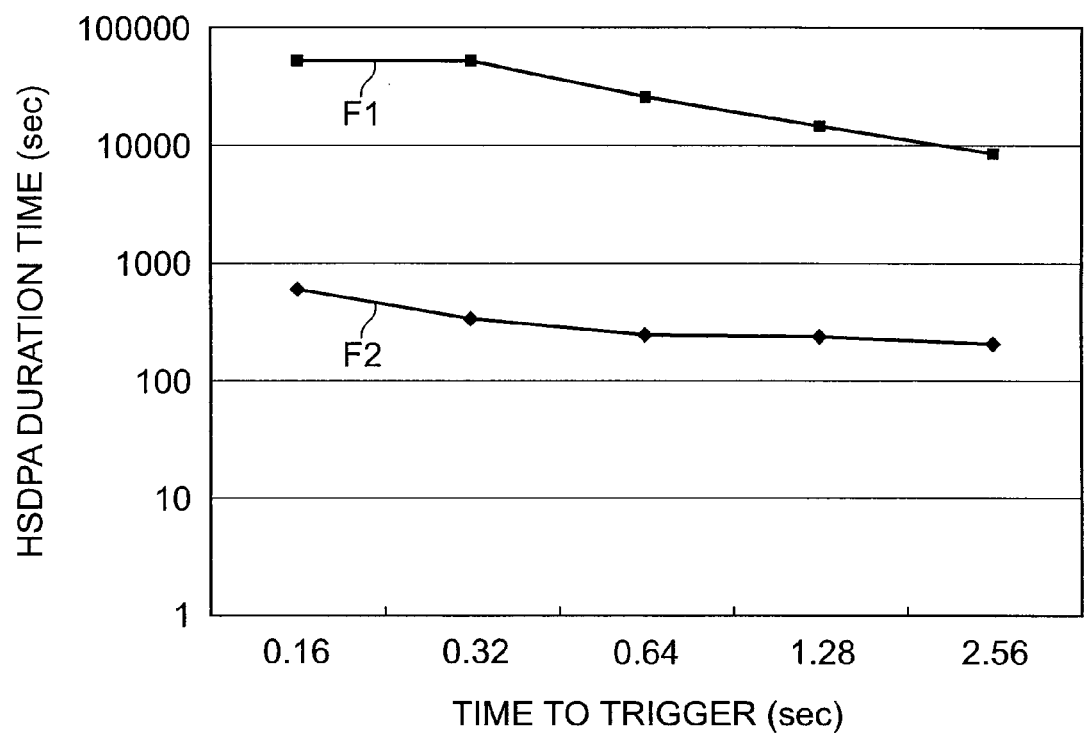
FIG. 15 is a drawing for explaining an example.

FIG. 15 is the computer simulation result of HSDPA duration time against time-to-trigger in the mobile communication system using the HSDPA system. In this simulation, hysteresis and cell-individual-offsets were set to zero, and a propagation path model used was two-wave Rayleigh fading with the maximum Doppler frequency of 5.55 Hz. As shown in FIG. 15, at time-to-trigger of 0.16 sec, the HSDPA duration time F1 of the mobile communication system 100 as an example is increased to about 100 times the HSDPA duration time F2 of the mobile communication system as a conventional example.

As described above, while the mobile station 10 moves among the cells 21a-25a of the radio base stations 21-25, the mobile station 10 gives the change command to change the configuration of the active set 20 so as to implement stabler radio communication. However, when the HSSC in radio communication through the HS-PDSCH with the mobile station 10 is a change target, it becomes difficult to maintain the radio communication through the HS-PDSCH. In the mobile communication system 100 of the embodiment, the determination of maintenance of the radio communication through the HS-PDSCH is made even in the case where the HSSC is the change target; therefore, the mobile station is able to maintain the radio communication through the HS-PDSCH.

What is claimed is:

1. A radio control method using a mobile station, a radio base station group comprising a plurality of radio base stations to perform radio communication with the mobile station, and a radio control apparatus for controlling the radio communication of the mobile station with the radio base station group, the radio control method comprising: a mobile station communication step wherein the mobile station performs radio communication through an A-DPCH (Associated-Dedicated Physical CHannel) with at least one of the radio base stations within the radio base station group and also performs radio communication through a HS-PDSCH (High Speed-Physical Downlink Shared CHannel) with at least one of the radio base stations within the radio base station group, a mobile station notification step, wherein the mobile station sends the radio control apparatus a command to eliminate one or more radio base stations with a low radio quality from the radio base station group and to add to the radio base station group a radio base station with a radio quality higher than that of the one or more radio base station elimination targets, among radio base stations not included in the radio base station group; an acquisition step wherein the radio control apparatus receives the command sent by the mobile station; a determination step wherein when the at least one of the radio base stations in communication with the mobile station through the HS-PDSCH is included as the elimination target and the mobile station is capable of communicating through the HS-PDSCH with at least one of the other radio base stations within the radio base station group, the radio control apparatus makes a determination to eliminate the at least one of the radio base stations in communication with the mobile station through the HS-PDSCH from the radio base station group and communicate through the HS-PDSCH with the at least one of the other radio base station within the radio base station group capable of communicating with the mobile station through the HS-PDSCH, and when the at least one of the radio base stations in radio communication through the HS-PDSCH with the mobile station is included in the one or more radio base station elimination targets, the radio control apparatus makes a determination to maintain radio communication through the HS-PDSCH with the at least one radio base station, ignoring the command received from the mobile station; and a control apparatus notification step wherein the radio control apparatus notifies the mobile station of a command to maintain radio communication via said HS-PDSCH based on a result of the determination step.

2. A radio control method using a mobile station, a radio base station group comprising a plurality of radio base stations to perform radio communication with the mobile station, and a radio control apparatus for controlling the radio communication of the mobile station with the radio base station group, the radio control method comprising: a mobile station communication step wherein the mobile station performs radio communication through an A-DPCH (Associated-Dedicated Physical CHannel) with at least one of the radio base stations within the radio base station group and also performs radio communication through a HS-PDSCH (High Speed-Physical Downlink Shared CHannel) with at least one of the radio base stations within the radio base station group, a mobile station notification step, wherein the mobile station sends the radio control apparatus a command to eliminate one or more radio base stations included in the radio base station group, from the radio base station group; an acquisition step wherein the radio control apparatus receives the command sent by the mobile station; a determination step wherein when the at least one of the radio base stations in communication with the mobile station through the HS-PDSCH is included as the elimination target and the mobile station is capable of communicating through the HS-PDSCH with at least one of the other radio base stations within the radio base station group, the radio control apparatus makes a determination to eliminate the at least one of the radio base stations in communication with the mobile station through the HS-PDSCH from the radio base station group and communicate through the HS-PDSCH with the at least one of the other radio base station within the radio base station group capable of communicating with the mobile station through the HS-PDSCH, and when the at least one of the radio base stations station in radio communication through the HS-PDSCH with the mobile station is included in the one or more radio base station elimination targets, the radio control apparatus makes a determination to maintain radio communication through the HS-PDSCH with the one radio base station, ignoring the command received from the mobile station; and a control apparatus notification step wherein the radio control apparatus notifies the mobile station of a command to maintain radio communication with said one radio base station via said HS-PDSCH based on a result of the determination step.

3. The radio control method according to claim 1, wherein the communication from the radio base station group to the mobile station is carried out using HSDPA (High Speed Downlink Packet Access).

4. The radio control method according to claim 2, wherein the communication from the radio base station group to the mobile station is carried out using HSDPA (High Speed Downlink Packet Access).

5. A radio control apparatus for controlling radio communication between a mobile station and a radio base station group comprising a plurality of radio base stations, the radio control apparatus comprising:
    an interface configured to receive, from a mobile station performing radio communication through an A-DPCH (Associated-Dedicated Physical CHannel) with at least one of the radio base stations within the radio base station group and also performing radio communication through a HS-PDSCH (High Speed-Physical Downlink Shared CHannel) with at least one of the radio base stations within the radio base station group, a command to eliminate one or more radio base stations included in the radio base station group, from the radio base station group;
    a determining unit configured to make a determination to eliminate the at least one of the radio base stations in communication with the mobile station through the HS-PDSCH from the radio base station group and communicate through the HS-PDSCH with at least one of the other radio base station within the radio base station group capable of communicating with the mobile station through the HS-PDSCH when the at least one of the radio base stations in communication with the mobile station through the HS-PDSCH is included as the elimination target and the mobile station is capable of communicating through the HS-PDSCH with the at least one of the other radio base stations within the radio base station group, and to maintain radio communication through the HS-PDSCH with the at least one of the radio base stations in radio communication through the HS-PDSCH with the mobile station, ignoring the command received from the mobile station, when the at least one of the radio base stations in radio communication through the HS-PDSCH with the mobile station is included in the one or more radio base station elimination targets; and
    the interface configured to notify the mobile station of a command to maintain radio communication with said one radio base station via said HS-PDSCH based on a result of the determination performed by the determining unit.

* * * * *